United States Patent [19]
Thomas et al.

[11] Patent Number: 5,211,239
[45] Date of Patent: May 18, 1993

[54] METHOD OF MAINTAINING SUBTERRANEAN FORMATION PERMEABILITY AND INHIBITING CLAY SWELLING

[75] Inventors: Todd R. Thomas, Coroapolis; Kevin W. Smith, McMurray, both of Pa.

[73] Assignee: Clearwater, Inc., Pittsburgh, Pa.

[21] Appl. No.: 835,602

[22] Filed: Feb. 13, 1992

[51] Int. Cl.$^5$ .................. E21B 43/22; E21B 43/26
[52] U.S. Cl. ............... 166/308; 166/305.1; 252/8.551
[58] Field of Search ............. 166/294, 305.1, 308, 166/275; 405/264; 252/8.551, 8.554

[56] References Cited

U.S. PATENT DOCUMENTS

| | | |
|---|---|---|
| 2,761,835 | 9/1956 | Brown . |
| 3,422,890 | 1/1969 | Durley . |
| 4,374,739 | 2/1983 | McLaughlin et al. ........... 252/8.551 |
| 4,447,342 | 5/1984 | Borchardt et al. .............. 252/8.554 |
| 4,842,073 | 6/1989 | Himes et al. ................. 166/294 |
| 4,974,678 | 12/1990 | Himes et al. ................. 166/308 |
| 4,977,962 | 12/1990 | Himes et al. ................. 166/305.1 |
| 5,097,904 | 3/1992 | Himes ....................... 166/305.1 |
| 5,099,923 | 3/1992 | Aften et al. .................. 166/294 |

OTHER PUBLICATIONS

Donald G. Hill, "Clay Stabilization—Criteria for Best Performance" Mar. 24–25, 1982, SPE 10656 pp. 127–138.

Himes, Vinson & Simon "Clay Stabilization in Low-Permeability Formations" SPE Production Engineering, Aug. 1991 pp. 252–258.

*Primary Examiner*—George A. Suchfield
*Attorney, Agent, or Firm*—William L. Krayer

[57] ABSTRACT

Moulding and migration of subterranean clay is inhibited during stimulation of the production of hydrocarbon fluids, and preparation therefor, by treating said formations with a compound of the formula $(CH_2=CH-CH_2)_nN^+(CH_3)_{4-n}X^-$ where X may be any anion which does not adversely react with the formation or treatment fluid and n is an integer from 1 to 4.

18 Claims, 7 Drawing Sheets

METHOD OF MAINTAINING SUBTERRANEAN FORMATION PERMEABILITY AND INHIBITING CLAY SWELLING

TECHNICAL FIELD

This invention relates to the hydraulic fracturing of underground formations for stimulating the production of oil, gas, and other formation fluids, and particularly to the maintenance of permeability in such formations. This invention includes the treatment of subterranean clays to prevent swelling, caused primarily by the absorption of water and/or gelling agents from stimulation fluids. It relates particularly to the use of certain chemical agents for the prevention of swelling of clays in situ.

BACKGROUND OF THE INVENTION

A good description of the problem which this application addresses may be found in U.S. Pat. No. 4,842,073 to Himes and Vinson. As described therein, clays and fines normally present in a formation will not obstruct the flow of desired hydrocarbons through the formation unless they are disturbed, typically by contact with aqueous well stimulation fluids. When so contacted, the fines tend to clog the capillary passages of the formation, and the clays, depending on their type and structure, will tend to swell in varying degrees.

Salts such as potassium chloride have been widely used to convert the clays from the sodium form by ion exchange to, for example, the potassium form which is less vulnerable to swelling; the physical introduction of such salts causes difficulties, however, with the preparation of the viscosifying polymeric materials typically used to stimulate the formation. Unsuccessful or difficult attempts to prepare combined KCl-polymer compositions in large quantities at the fracturing site led to the Himes/Vinson invention, as described in the above mentioned '073 patent.

Himes and Vinson propose to use various relatively high molecular weight ammonium, morpholinium and pyridinium halides as cations to exchange with the sodium of the clays. They describe the reduction of clay swelling and the maintenance of formation permeability when such cationic compounds are used in conjunction with the stimulation or treatment fluids, such as aqueous solutions of polymers, gels and the like. However, the compositions described by Himes and Vinson generally have a low charge density and to that extent are inefficient; moreover, many compounds used for clay treatment cause undesirable foam during solution preparation and use.

Our invention is also effective to provide relief from the difficulties described in Himes and Vinson U.S. Pat. No. 4,974,678, such as the adsorption of polysaccharides from fracturing fluids by the clays present in subterranean formations.

SUMMARY OF THE INVENTION

We have found that the permeability of subterranean formations may be maintained — that is, fines present or released by the fracturing process can be prevented from clogging capillary fissures and clays can be inhibited from swelling and slowing the flow of fluids — by including in the fracturing fluid an effective amount of a dimethyl diallyl ammonium salt having the structural formula:

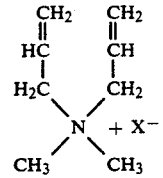

trimethyl allyl ammonium salt of the formula $CH_2=CH-CH_2-N^+(CH_3)_3$ $X^-$ or where X may be any anion compatible with the formation, preferably a halide and most preferably chloride; use of the corresponding triallyl and tetraallyl ammonium compounds is also within our invention. Thus, our invention employs compounds of the general formula $(CH_2=CH-CH_2)_nN(CH_3)_{4-n}$ $X^-$ where X is as above defined and n is an integer from 1 to 4. Our presently preferred compound is dimethyl diallyl ammonium chloride, but X may be any halide. For their molecular weight, our allyl quaternaries have high charge densities, which is desirable in our applications. The allyl group affects the strength of the cationic charge of the molecule; moreover, there are two fewer hydrogens in the molecule for each allyl group, further increasing the charge density with respect to the molecular weight.

As mentioned in the above referenced Himes and Vinson patent, the clays which may be present in the formations and/or cause difficulties include the montmorillonite (smectite) group such as montmorillonite, saponite, nontronite, hectorite, and sauconite; the kaolin group such as kaolinite, nacrite, dickite, and halloysite; the hydrousmica group such a hydrobiotite, glauconite, illite and bramalite; the chlorite group such as chlorite and chamosite, and in addition vermiculite, attapulgite and sepiolite and mixed-layer varieties of the above minerels and groups. The entire specification of the Himes and Vinson U.S. Pat. No. 4,842,073 is incorporated herein by reference as it should be understood that the present invention is applicable in all respects to the conditions and environment described in the '073 patent.

The allyl ammonium salts which we employ may be admixed with the aqueous fracturing fluid in an effective amount to substantially stabilize the formation against permeability damage as a result of contact with the aqueous fracturing fluid. The formation control additive allyl ammonium salt is generally admixed with the aqueous fracturing fluid in an amount of at least about 0.05 percent by weight of the fracturing fluid. Preferably the formation control additive is present in an amount of from about 0:1 to about 5 percent by weight of the aqueous fracturing fluid; most preferably about 0.2% to about 1%. The actual amount may be determined by estimates of the amount of clay in the formation using representative core samples in standard core flow testing as is known in the art.

The allyl ammonium salt may be admixed with the fracturing fluid at any time prior to contact of the fluid with the subterranean formation. In that the allyl ammonium salt is readily available as a liquid solution, it is readily mixed with the constituents of the aqueous, fracturing fluid both prior to and subsequent to hydration of the gelling agent. The most commonly used gelling agents presently are polysaccharides and in particular natural guar, hydroxypropyl guar, hydroxyethylcellulose, and xanthan gum, but our treating agents are compatible with any and all such materials. The polysaccharide or other gelling agent is typically used in a hydrocarbon solvent to form a "liquid gel concentrate." Our allyl quaternaries are also compatible with such concentrates.

BRIEF DESCRIPTION OF THE DRAWINGS

Our invention will be described with reference to certain examples and to the accompanying drawings, in which.

DETAILED DESCRIPTION OF THE INVENTION

As a demonstration that our invention may be used to replace the more or less conventional KCl treatment for the prevention of clay swelling in formation fracturing, our diallyl dimethyl ammonium chloride was compared with a 50% solution of dimethyl coco amine, distilled ("DMCD") in a capillary suction test.

As is known in the art, the capillary suction test employs a cylinder filled with fluid and terminating in blotter paper across its collar. It measures the rate of fluid migration in the blotter paper (the time to travel a calibrated distance) first when the cylinder is filled with treating fluid alone and second when it includes solids as well. The solids tend to accumulate on the blotter paper and cause a reduction in flow rate, which is compared; the rate of flow with or without the solids is proportional to the capillary pressure exerted by the standard blotter paper. The test was described in detail by Underdown and Conway in a paper entitled "Minimize Formation Damage by Rapid/ Inexpensive Method of Completion and Stimulation Fluid Selection" presented February 22-23, 1990 at a Society of Petroleum Engineers Symposium on Formation Damage Control held in Lafayette, La; see SPE publication 19432.

EXAMPLE I

Berea sandstone samples were disaggregated with a mortar and pestle until they passed through a 40 mesh sieve to yield a bulk of core material. Aliquots, 3,75 g, were added to 75 ml of base fluid and stirred at low speed on a Waring Blender for 30 minutes. The capillary suction time in seconds was determined in triplicate and the average value reported in Table I.

TABLE I

| Conc (v/v %) | TMBQ* | TMAC** | PCS*** | DMDAAC@ |
|---|---|---|---|---|
| 0 | 44.3 | 44.3 | 44.3 | 44.3 |
| 0 | 49.3 | 49.3 | 49.3 | 49.3 |
| 0 | 44 | 44 | 44 | 44 |
| 0.2 | 14.4 | 14.2 | 19.3 | 15.4 |
| 0.2 | 13.9 | 14.4 | 21 | 15.6 |
| 0.2 | 12.2 | 13.5 | 20.4 | 14.7 |
| 0.4 | 13 | 11 | 15.6 | 13.6 |
| 0.4 | 14.5 | 11.1 | 18.1 | 13.9 |
| 0.4 | 12.7 | 11.1 | 14.3 | 11.9 |
| 0.6 | 10.8 | 13.7 | 16.6 | 14.5 |
| 0.6 | 11.7 | 13.9 | 15.1 | 14.5 |
| 0.6 | 11.2 | 13.9 | 15.7 | 16 |
| 0.8 | 13.2 | 15.1 | 14.1 | 13.7 |
| 0.8 | 13.5 | 16.1 | 19 | 16.5 |
| 0.8 | 12.2 | 10.9 | 15 | 14.2 |

TABLE I-continued

| Conc (v/v %) | TMBQ* | TMAC** | PCS*** | DMDAAC@ |
|---|---|---|---|---|
| 1 | 14.2 | 13.8 | 16.5 | 12.3 |
| 1 | 12.9 | 15.6 | 17.1 | 12.6 |
| 1 | 13.7 | 14.4 | 14.3 | 13.1 |

Figure 1:
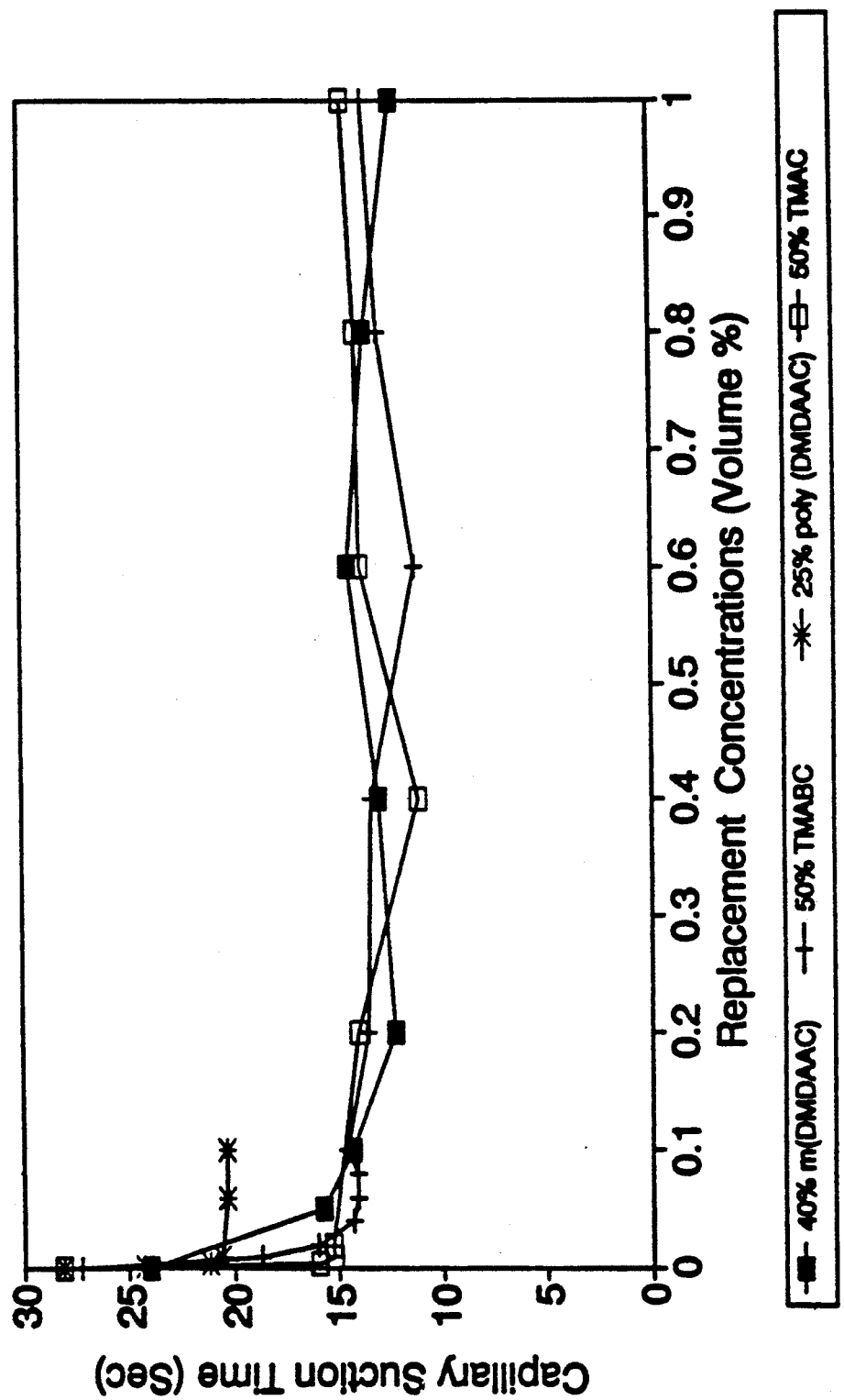
FIG. 1 represents the results of capillary suction tests comparing monomeric dimethyl diallyl ammonium chloride with three other KCl replacements.
Figure 2:
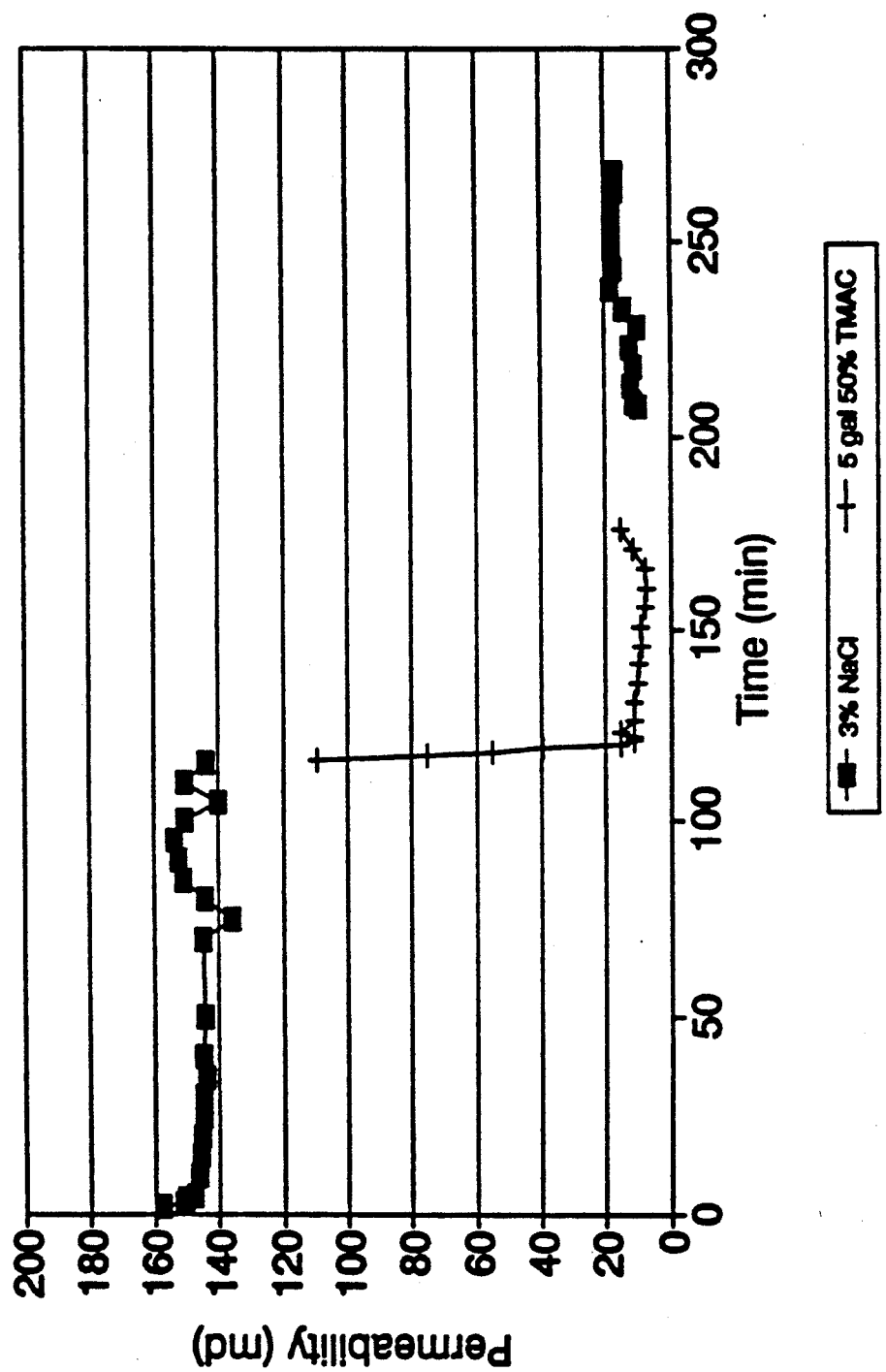
FIGS. 2, 3, 4, and 5 represent the results of standard core tests on tetramethyl ammonium chloride.
Figure 3:
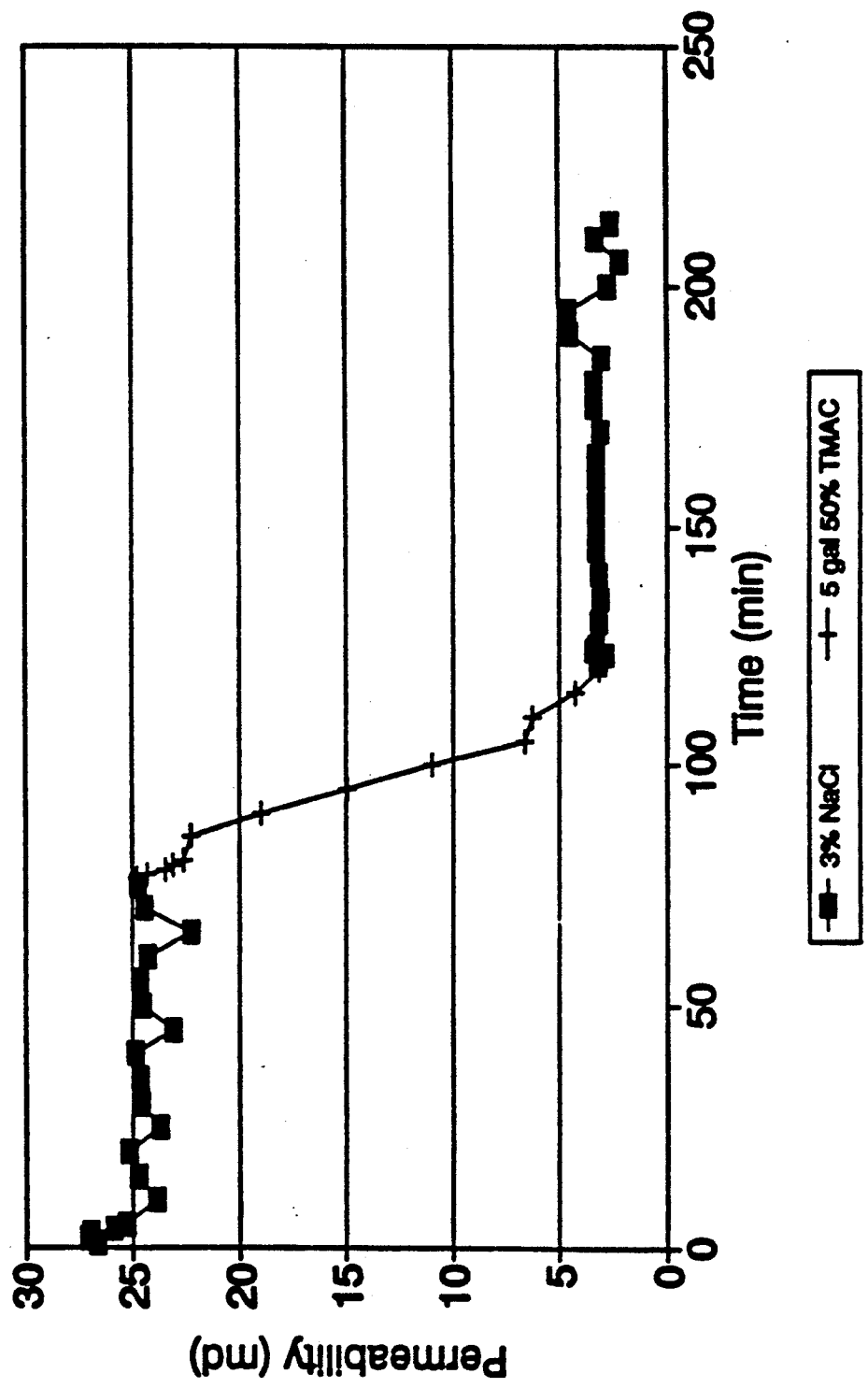
Figure 4:
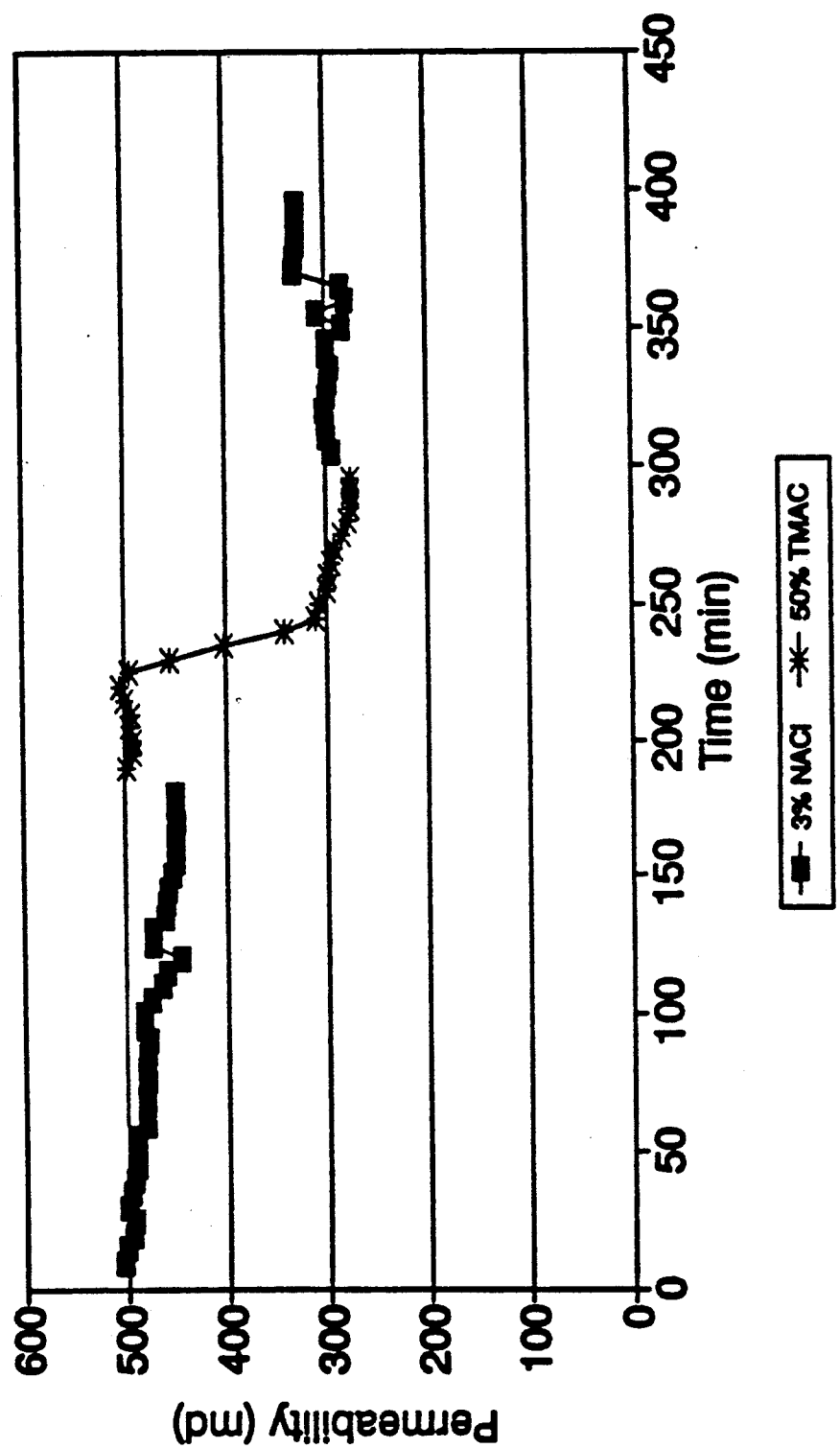
Figure 5:
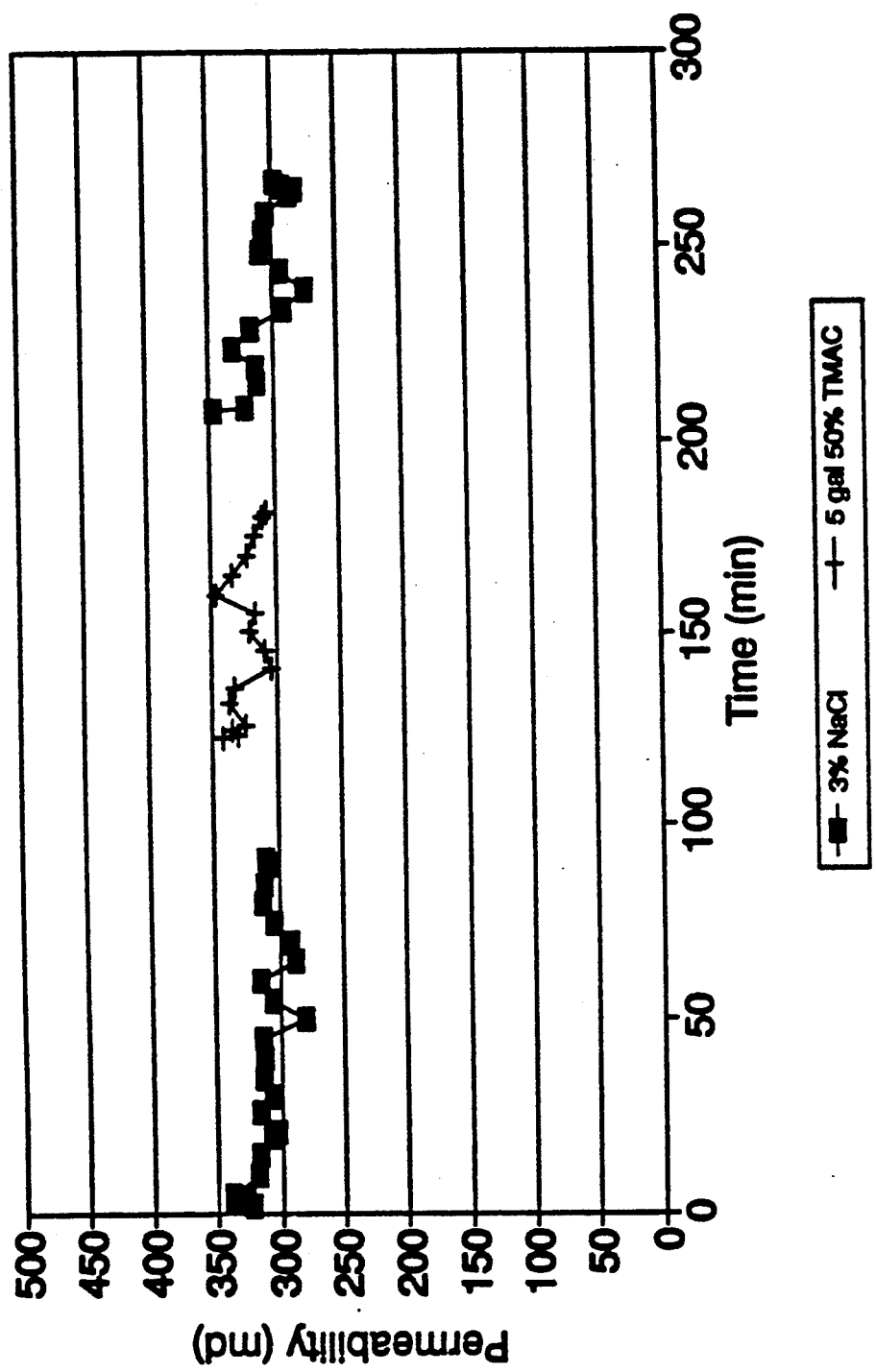

*Trimethyl ammonium benzyl chloride
**Tetramethyl ammonium chloride
***25% solution of poly(dimethyldiallyl ammonium chloride)
@Dimethyl diallyl ammonium chloride A similar test was run on the same Berea core material using KCl and ammonium chloride for comparison, as shown in Table II. These results are depicted graphically in FIG. 1.

TABLE II

| Conc (w/v %) | KCl | NH4 |
|---|---|---|
| 0.125 | 16.4 | 13.8 |
| 0.125 | 13.6 | 13.2 |
| 0.125 | 14 | 13.2 |
| 0.25 | 14.8 | 13.4 |
| 0.25 | 13.1 | 13.1 |
| 0.25 | 12.4 | 13 |
| 0.5 | 13.8 | 12.9 |
| 0.5 | 13.1 | 12.6 |
| 0.5 | 11.4 | 12.5 |
| 1 | 12.4 | 12.7 |
| 1 | 12.5 | 13.5 |
| 1 | 13.1 | 12.9 |
| 2 | 13.7 | 12.2 |
| 2 | 12.2 | 12.3 |
| 2 | 13.8 | 13 |

From the results in Tables I and II it may be seen that the dimethyl diallyl ammonium chloride performs at least as well as any standard material, in addition to its advantage of not causing any foaming or other adverse reaction.

Similar tests were run which demonstrate the effectiveness of our material at very low concentrations:

Example II

In this experiment, a 40% solution of DMDAAC was compared against a 50% solution of DMCD in a capillary suction test as described above, with the results shown in Table III.

TABLE III

| DMDAAC | | 50% DMCD | |
|---|---|---|---|
| CONC (gal/1000 gal) | TIME | CONC (gal/1000 gal) | TIME |
| 0.015 | 18 | 0.25 | 14.4 |
| 0.030 | 12.8 | 0.50 | 13.9 |
| 0.030 | 12.8 | 1.00 | 12.1 |
| 0.063 | 12.5 | 2.00 | 10.3 |
| 0.125 | 13.5 | FRESHWATER | 20.4 |
| 0.250 | 20.6 | 2% KCl | 13.8 |
| 0.500 | 28.0 | | |
| 1.000 | 26.8 | | |
| 2.000 | 36.9 | | |
| FRESHWATER | 25.0 | | |
| 2% KCl | 13.8 | | |

These data may be considered surprising by persons skilled in the are since very low concentrations of DMDAAC result in considerably reduced capillary suction times.

Example III

The following procedure was used in the core flow tests reported below. Berea cores were cut using 3% NaCl. The core was then trimmed and loaded into a Hassler sleeve. The annulus pressure was raised to 1000 psi confining stress at a temperature of 75° F. A high pressure Bechman duplex pump was used to pump a deodorized refined mineral oil, which was diverted to a displacement vessel to pump brines and treating fluids through the core. A manifold and valve arrangement allowed the fluid to be pumped by the face of the core when changing fluids to insure that there is a clean change of fluids. All fluids passed through two in-line 0.5 micron nupro filters before entering the core. A back pressure regulator was set at 100 psi to maintain a constant pore pressure. The sequences in the test were 3% NaCl, then the KCl replacement, followed by a regain permeability with 3% NaCl. All fluids were pumped in the same direction.

Figure 6:
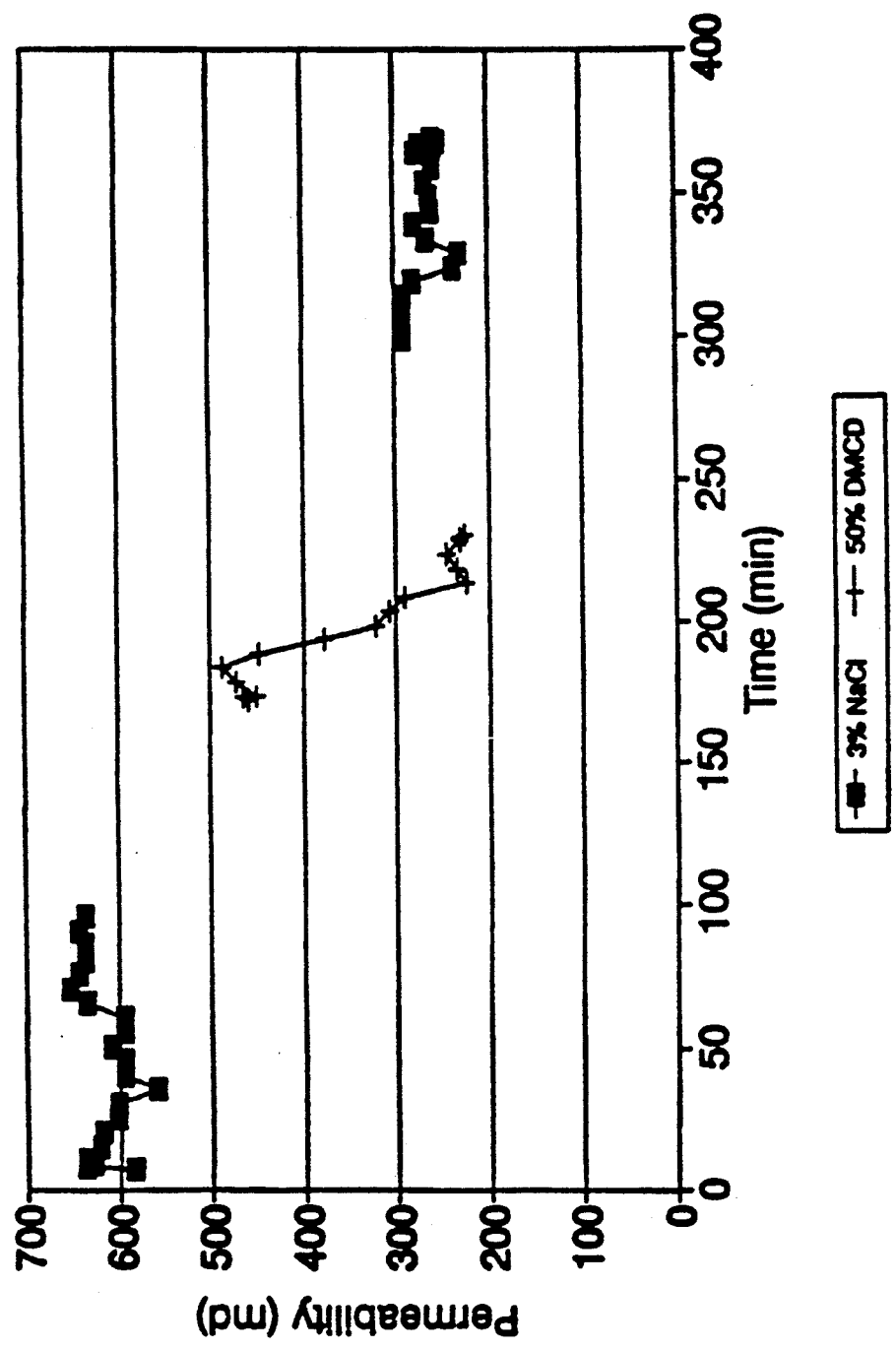
FIG. 6 is a similar test for dimethyl cocoa amine.
Figure 7:
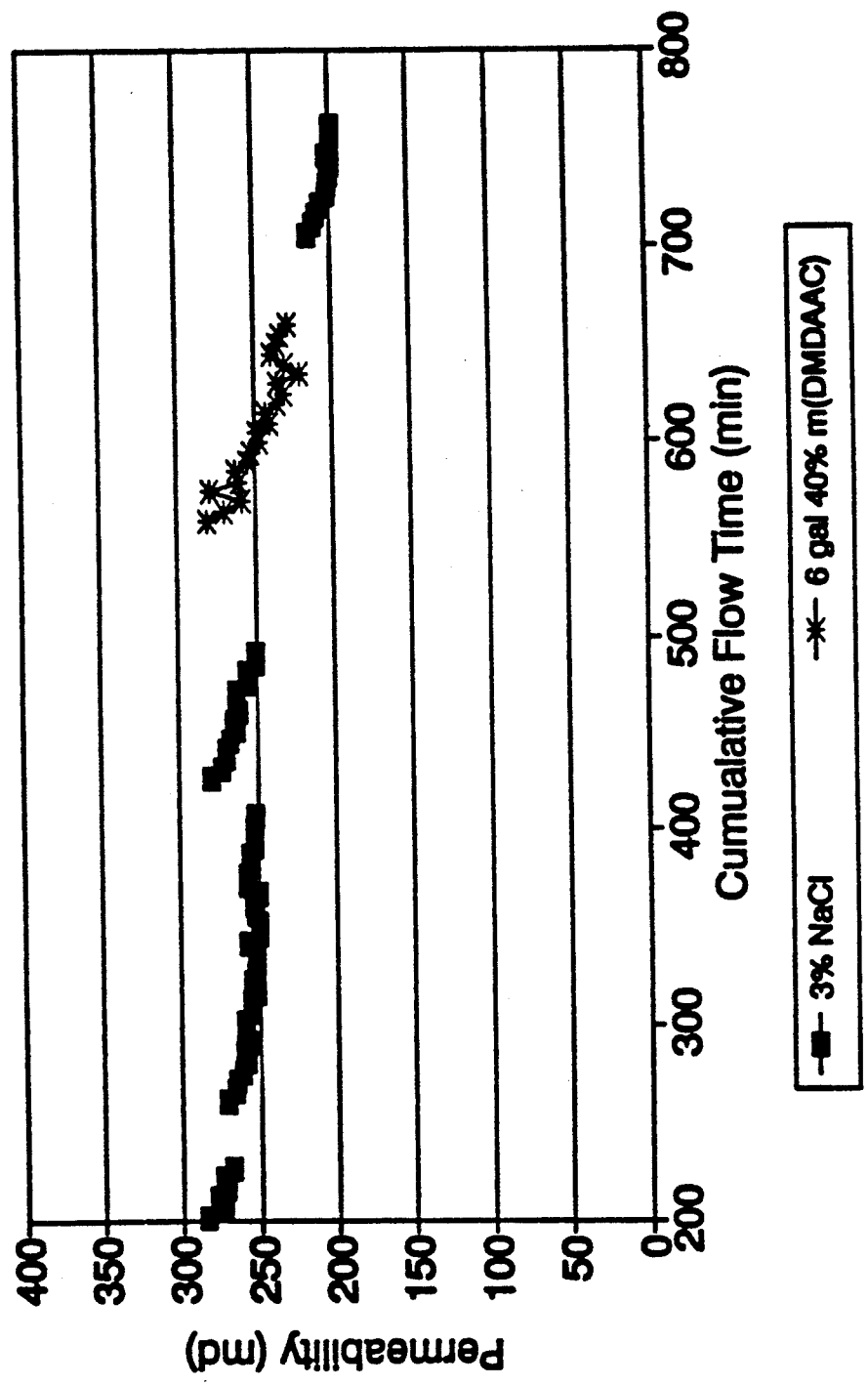
FIG. 7 shows the results of a similar core test using a material we employ, dimethyl diallyl ammonium chloride.

Core flow tests were run to compare the 40% DMDAAC solution to 50% DMCD and 50% TMAC. See FIGS. 2, 3, 4, and 5 for TMAC; FIG. 6 for the results with DMCD and FIG. 7 with DMDAAC.

We claim:

1. Method of treating a subterranean formation comprising contacting the subterranean formation with an aqueous solution of a treatment fluid containing an effective amount of a formation control additive comprising at least one compound of the formula $(CH_2=CH-CH_2)_n N^+(CH_3)_{4-n} X^-$ where X is any anion that does not adversely react with the formation or treatment fluid and n is an integer from 1 to 4 whereby permeability damage resulting from contact of the aqueous fluid with the formation is reduced.

2. Method of claim 1 wherein said formation control additive is present in an amount of at least about 0.05% by weight of the treatment fluid.

3. Method of claim 1 wherein said formation control additive is present in an amount of at least about 0.1 to about 5% by weight of the treatment fluid.

4. Method of claim 1 wherein said formation control additive is present in an amount of from about 0.2% to about 1% by weight of the treatment fluid.

5. Method of claim wherein the treatment fluid includes a gelling agent to viscosify the treatment fluid.

6. Method of claim 1 wherein $X^-$ is a halide.

7. Method of claim 1 wherein $X^-$ is chloride.

8. Method of claim 1 wherein the formation control additive is dimethyl diallyl ammonium chloride.

9. Method of claim 1 wherein the formation control additive is methyl triallyl ammonium chloride.

10. Method of claim 1 wherein the formation control additive is allyl trimethyl ammonium chloride.

11. Method of claim 1 wherein the formation control additive is tetraallyl ammonium chloride.

12. The method of stimulating production of hydrocarbons from a clay-containing subterranean formation comprising preparing an aqueous treatment fluid comprising ar aqueous fluid, a selected gelling agent and a formation control additive of the formula $(CH_2=CH-CH_2)_n N^+(CH_3)_{4-n} X^-$ where X is a halide and n is an integer from 1 to 4, and contacting said formation with said aqueous treatment fluid under conditions such that at least one fracture is caused to be created in said formation by said fluid whereby the subsequent production of hydrocarbons is facilitated, said formation control additive being present in said treatment fluid in an effective amount whereby permeability damage resulting from contact of the clays in the formation with the aqueous fluid in the treatment fluid is reduced.

13. Method of claim 12 wherein said formation control additive is present in an amount in excess of about 0.05% by weight of said aqueous treatment fluid.

14. Method of claim 12 wherein said formation control additive is present in an amount of from about 0.1 to about 5% by weight of said aqueous treatment fluid.

15. Method of claim 12 wherein said formation control additive is dimethyl diallyl ammonium chloride.

16. Method of claim 12 wherein said formation control additive is allyl trimethyl ammonium chloride.

17. Method of claim 12 wherein said formation control additive is methyl triallyl ammonium chloride.

18. Method of claim 12 wherein said formation control additive is tetraallyl ammonium chloride.

* * * * *